United States Patent
Bojeryd

(10) Patent No.: US 8,983,459 B2
(45) Date of Patent: Mar. 17, 2015

(54) MODIFICATION OF INFORMATION IN A COMMUNICATION NETWORK

(71) Applicant: TeliaSonera Ab, Stockholm (SE)

(72) Inventor: Nils Bojeryd, Karlstad (SE)

(73) Assignee: Teliasonera AB, Stockholm (SE)

( * ) Notice: Subject to any disclaimer, the term of this patent is extended or adjusted under 35 U.S.C. 154(b) by 55 days.

(21) Appl. No.: 13/799,742

(22) Filed: Mar. 13, 2013

(65) Prior Publication Data

US 2013/0244646 A1 Sep. 19, 2013

(30) Foreign Application Priority Data

Mar. 14, 2012 (EP) ..................... 12159402

(51) Int. Cl.
- *H04W 4/00* (2009.01)
- *H04W 36/00* (2009.01)
- *H04W 24/00* (2009.01)
- *H04W 8/06* (2009.01)
- *H04W 8/30* (2009.01)

(52) U.S. Cl.
CPC . *H04W 8/06* (2013.01); *H04W 8/30* (2013.01)
USPC .......... 455/433; 455/456.1; 455/436

(58) Field of Classification Search
USPC .......... 455/435.1, 432.1–444, 456.1–457
See application file for complete search history.

(56) References Cited

U.S. PATENT DOCUMENTS

| 6,381,456 B1* | 4/2002 | Ko .................. 455/435.1 |
| 6,731,932 B1* | 5/2004 | Rune et al. ............ 455/432.1 |
| 2005/0261005 A1* | 11/2005 | Hu .................. 455/456.5 |
| 2008/0004014 A1* | 1/2008 | Palviainen ............ 455/435.1 |

FOREIGN PATENT DOCUMENTS

WO 2008/078338 A2 7/2008

OTHER PUBLICATIONS

3GPP TS 23.012 v10.1.0, dated Jun. 2011.*
3GPP TS 23.002 v11.2.0, dated Mar. 9, 2012.*

(Continued)

*Primary Examiner* — Daniel Lai
(74) *Attorney, Agent, or Firm* — Young & Thompson

(57) ABSTRACT

A method for modifying information stored in a mobile communication network includes steps of receiving, in a network element, a request for an operation in the mobile communication network relating to a user equipment; deriving information on the first register on the basis of the request; determining information on a second register for the user equipment in the network element; comparing information on the first register derived on the basis of the request with information on the second register determined for the user equipment in the network element; and if the outcome of the comparison indicates a mismatch between the information on the first and second registers, the second register is requested to initiate the modification of information in a third register. A network element implementing at least part of the steps of the method is also described.

14 Claims, 3 Drawing Sheets

(56) References Cited

OTHER PUBLICATIONS

"3rd Generation Partnership Project; Technical Specification Group Services and System Aspects; Circuit Switched (CS) fallback in Evolved Packet System (EPS); Stage 2 (Release 11)", 3GPP Standard; 3GPP TS 23.272, 3rd Generation Partnership Project (3GPP), Mobile Competence Centre., 650, Route Des Lucioles., F-06921 Sophia-Antipolis Cedex., France, vol. SA WG2, No. V11.0.0, Mar. 8, 2012, pp. 1-87, XP050555343, [retrieved on Mar. 2012] * paragraph [4.3.2] * * paragraph [5.4.1] *.

European Search Report, dated Sep. 3, 2012, from corresponding European application.

* cited by examiner

MODIFICATION OF INFORMATION IN A COMMUNICATION NETWORK

TECHNICAL FIELD

The invention concerns in general the technical field of mobile communications. Especially the invention concerns information management in the mobile communications network.

BACKGROUND OF THE INVENTION

Mobile communication networks enable wireless communication to and from a mobile user equipment. Typically, the user terminal is served by a base station within an area and the base station is coupled to other network elements within the network. The connection of the base station to the other network elements is usually implemented by wired means in order to provide secure channels with high capacity for communication. As the mobile communication is based on the fundamental thinking that the user equipment may move from one place to another within the network coverage a reasonable amount of control and management relating to the mobility is needed.

Mobile communication network can be divided to two main entities. First one is so called core network (CN), which is a central part of the network providing various services to customers who are connected by the access network. The second entity is called radio access network (RAN), which implements a radio access technology for user equipments within the coverage of the network. The radio access network typically comprises base stations and possibly some controlling elements for the base stations. The radio access network is controlled and managed at least partly by the core network.

Mobile communication networks normally comprise a network element residing typically in the core network, which is mainly taking care of the control and management functions, such as end-to-end connection, mobility and handover related tasks. In GSM and UMTS such an element is a Mobile Switching Centre (MSC). In Long Term Evolution (LTE) network similar element is Mobility Management Entity (MME). Said network elements are normally specific to different location areas i.e. one network element takes care of the control and management functions within a location area.

In addition to a network element taking care of the control and management functions the core network comprises at least some registers in order to store and maintain subscriber related information. First such register is a so called Home Location Register (HLR), which is a database storing permanently information on subscribers. More specifically, HLR stores details of Subscriber Identity Module (SIM) cards issued by a telecom operator. Each SIM has a unique identifier called International Mobile Subscriber Identity (IMSI), which is primary identifier for each record stored in the HLR. The HLR also stores e.g. Mobile Subscriber Integrated Services Digital Network Number (MSISDN), which is a number uniquely identifying a subscription in a mobile communication network and used of routing calls to the subscriber. Other pieces of information stored in the HLR are location information of the UE and roaming related issues among others. Even if it is said that there is only one HLR for any given network, in practice the information stored in the HLR is spread out across the network into multiple physical HLRs.

Second register type belonging to core network is so called Visitor Location Register (VLR). VLR is a database containing at least partly the same information as stored in the HLR. The difference is that when the HLR contains the information on all the subscribers for the telecom operator, the VLR contains information on subscribers currently residing in its location area. This is consequence of the implementation of the mobile communication network in which the network is divided to different location areas comprising necessary network elements in order to provide the service for the subscribers residing in that specific area and reducing thus the load to the central network elements and registers, such as VLR, as well as reducing the network traffic. Different VLRs can be identified with a Location Area Code (LAC) for the area they serve. A typical way to implement a VLR is to integrate it to a network element taking care of a management and controlling functions, such as MSC.

FIG. 1 illustrates a simplified network structure, which clarifies the hierarchy of the different network elements and devices as described above. The FIG. 1 illustrates two location areas A and B. Both location areas A and B comprise a network element $101_A$ and $101_B$ for control and management functions, which are configured to interact with each other e.g. in a situation when a user equipment moves from a first location area A, B to the other location area A, B. The network element $101_A$, $101_B$ is configured to control and manage the radio access network. FIG. 1 illustrates only the base stations $102_A$, $102_B$ belonging to the corresponding radio access network. The radio access network may comprise some further elements for some further purposes, such as further controlling and management, which are not illustrated here. The base stations $102_A$, $102_B$ are configured to communicate with the user terminals $103_A$, $103_B$ allocated within the location area A, B. Furthermore, the network elements $101_A$, $101_B$ are configured to communicate with subscriber registers $104_A$, $104_B$, such as VLRs, belonging serving the same location area as the network element $102_A$, $102_B$. The subscriber registers $104_A$, $104_B$ serving the location area are configured to receive and transmit information to and from central subscriber register 105, such as a HLR. Furthermore, the network elements $101_A$, $101_B$ may communicate directly with the central subscriber register 105 (not illustrated in FIG. 1). The network element $101_A$, $101_B$ can be e.g. MSC or MME depending on the implemented radio communication technology. Similarly, base stations $102_A$, $102_B$ may implement GSM or 3G based radio technologies or LTE technology, in which case the base stations area called eNodeBs.

Each subscriber shall not be present in more than one VLR $104_A$, $104_B$ at a time. However, for some reasons it may happen that the same user equipment (UE) $103_A$, $103_B$ is registered to two VLRs $104_A$, $104_B$ simultaneously which, in turn, causes call attempts toward the UE $103_A$, $103_B$ to fail until the dual VLR $104_A$, $104_B$ registration is canceled. More specifically, when UE $103_A$, $103_B$ is registered in two VLRs $104_A$, $104_B$, one VLR $104_A$, $104_B$ is known by the HLR 105 in the mobile network, and terminated calls are directed to that VLR $104_A$, $104_B$. The other VLR $104_A$, $104_B$ is handling the UE $103_A$, $103_B$, and UE originated calls are handled by that VLR $104_A$, $104_B$. The former VLR $104_A$, $104_B$ is the wrong VLR $104_A$, $104_B$, and the latter is the correct VLR $104_A$, $104_B$.

Being registered in two VLRs $104_A$, $104_B$ is an error case that is caused by cancel location messages being lost between HLR 105 and VLRs $104_A$, $104_B$. The cancel location messages can be lost if there is a disturbance in the mobile communication network so that the VLR $104_A$, $104_B$ is not reachable by any other network element. Then no messages will be received by the VLR $104_A$, $104_B$, and an active UE will also be assigned to other VLRs $104_A$, $104_B$. When the disturbance in the communication network ceases, dual VLR registration may exist for some UEs.

Today the solution to correct the dual VLR $104_A$, $104_B$ situation is to wait customer complaints and in response to that reset the VLR $104_A$, $104_B$. This makes the UE to register again to the mobile communication network and a correct VLR $104_A$, $104_B$ can be allocated. However, resetting VLRs $104_A$, $104_B$ is a costly process causing disturbance to all subscribers allocated to the VLR $104_A$, $104_B$ to be reset i.e. subscribers are not able to receive calls during the downtime of the VLRs $104_A$, $104_B$.

The above described situation may especially cause problems in the current telecommunication network setup in which multiple networks with different technologies are available in a certain location. For example, one telecom operator may have a LTE, WCDMA and GSM networks available. As it is known that LTE network does not currently offer any circuit switched services i.e. in case of a subscriber is served by the LTE network and he or she receives a mobile terminated call, the subscriber needs to be transferred to either WCDMA or GSM network in order to establish the call connection. Such an operation between the network technologies is called circuit switched fallback (CSFB). If the subscriber in such a case is allocated to multiple VLRs, it is probable that the subscriber cannot be transferred into a circuit switched network without any problem and the establishment of a call connection fails. Thus, it is important that there exists only one VLR association for one user terminal in a LTE network at a time.

SUMMARY OF THE INVENTION

An objective of the invention is to present a method and a network element for maintaining the information in the mobile communication network up-to-date. Another objective of the invention is that the method and the network element enable a simple detection and modification of any misinformation in the network so that the quality of service can be at least partly improved.

The objects of the invention are reached by a method and a network element as defined by the respective independent claims.

According to a first aspect, a method for modifying information stored in a mobile communication network is provided, wherein the method comprises steps of receiving, in a network element, a request for an operation in the mobile communication network relating to a user equipment, deriving information on the first register on the basis of the request, determining information on a second register for the user equipment in the network element, comparing information on the first register derived on the basis of the request with information on the second register determined for the user equipment in the network element, and if the outcome of the comparison indicates a mismatch between the information on the first and second registers, requesting the second register to initiate the modification of information in a third register.

The initiation of the modification of information in a third register comprises a step of delivering a location update request to the second register.

If the comparison indicates a mismatch between information compared, an indication on this is added to the location update request. The location update request may be modified by setting any previous location area information to null by the network element.

The request for an operation in the mobile communication network may be a paging request from the first register or a tracking area update request from the user equipment.

The step of determining the information on the second register for the user equipment can be based on IMSI information.

The information on the first and second registers used in the comparison step may be an identifier of the corresponding register. The mismatch of the information on the first and the second registers may indicate that the registers are not the same.

The step of modifying information in the third register may comprise a step of removing information on the first register. Further, the step of modifying information in the third register may comprise a step of storing information on the second register.

According to a second aspect, a network element, comprising at least one processor and at least one memory comprising portions of computer program code, is provided wherein the memory and the portions of computer program code are configured to, with the at least one processor, cause the network element at least to perform the following: receive a request for an operation in the mobile communication network relating to a user equipment, derive information on the first register on the basis of the request, determine information on a second register for the user equipment, compare information on the first register and information on a second register, and if the outcome of the comparison indicates a mismatch between the information on the first and second registers, request the second register to initiate the modification of information in a third register.

The network element may be configured to request the initiation of the modification of information in a third register by delivering a location update request to the second register. Further, the network element may be configured to add an indication of the mismatch between information compared to the location update request.

The network element may still be configured to modify the location update request by setting any previous location area information to null in the request.

The network element may also be configured to detect that the request for an operation in the mobile communication network is a paging request received from the first register or a tracking area update request received from the user equipment.

Furthermore, the network element may be configured to determine information on the second register for the user equipment on the basis of IMSI information.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION AND ITS ADVANTAGEOUS EMBODIMENTS

In the following the term user equipment is used to mean a subscriber terminal equipped with a necessary subscriber identity module, such as SIM card, in order to identity and authenticate the subscribers in one or more mobile communication network for enabling the communication in the networks.

Figure 1:
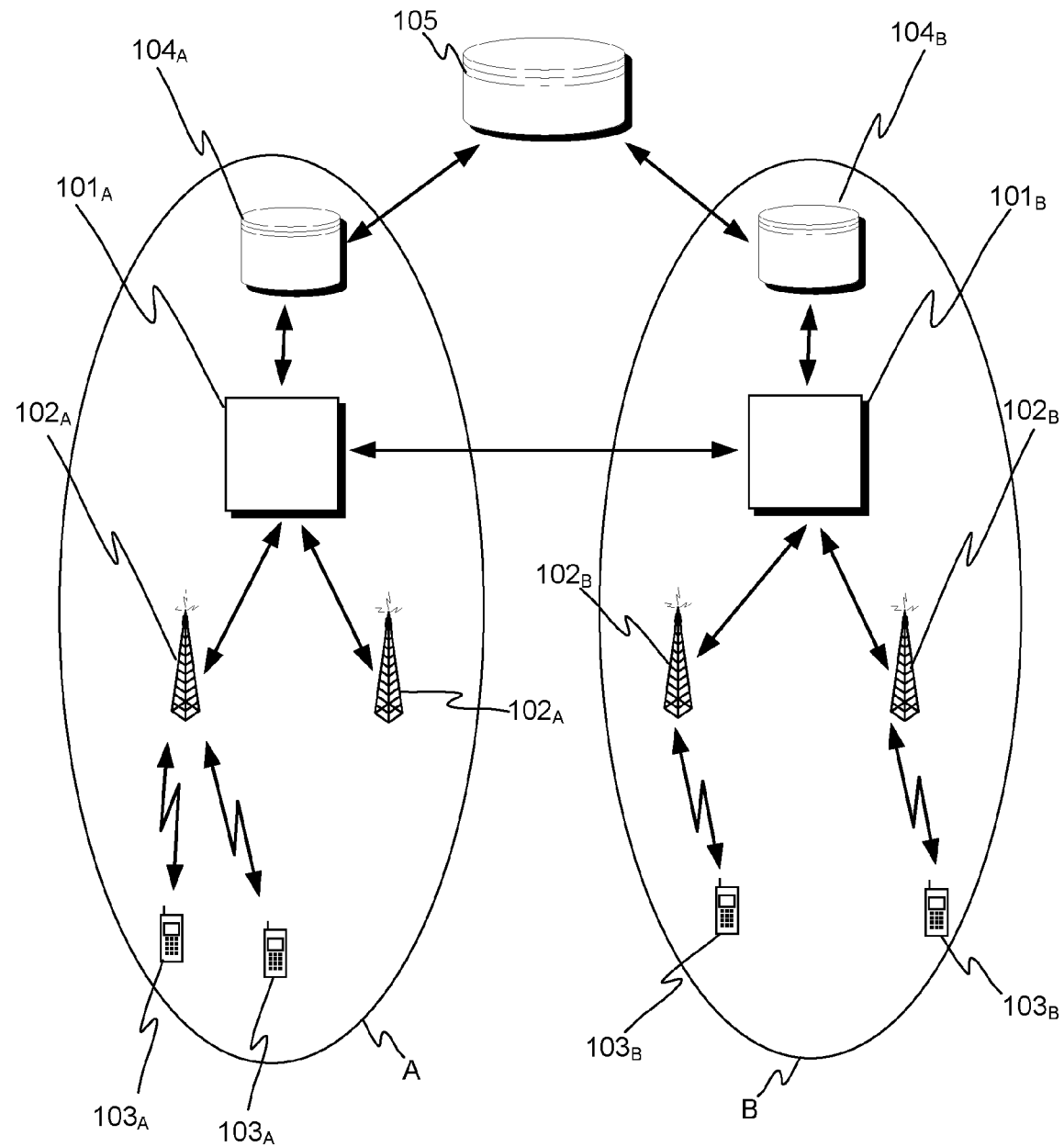
FIG. 1 illustrates a simplified network structure for background purposes.
Figure 2:
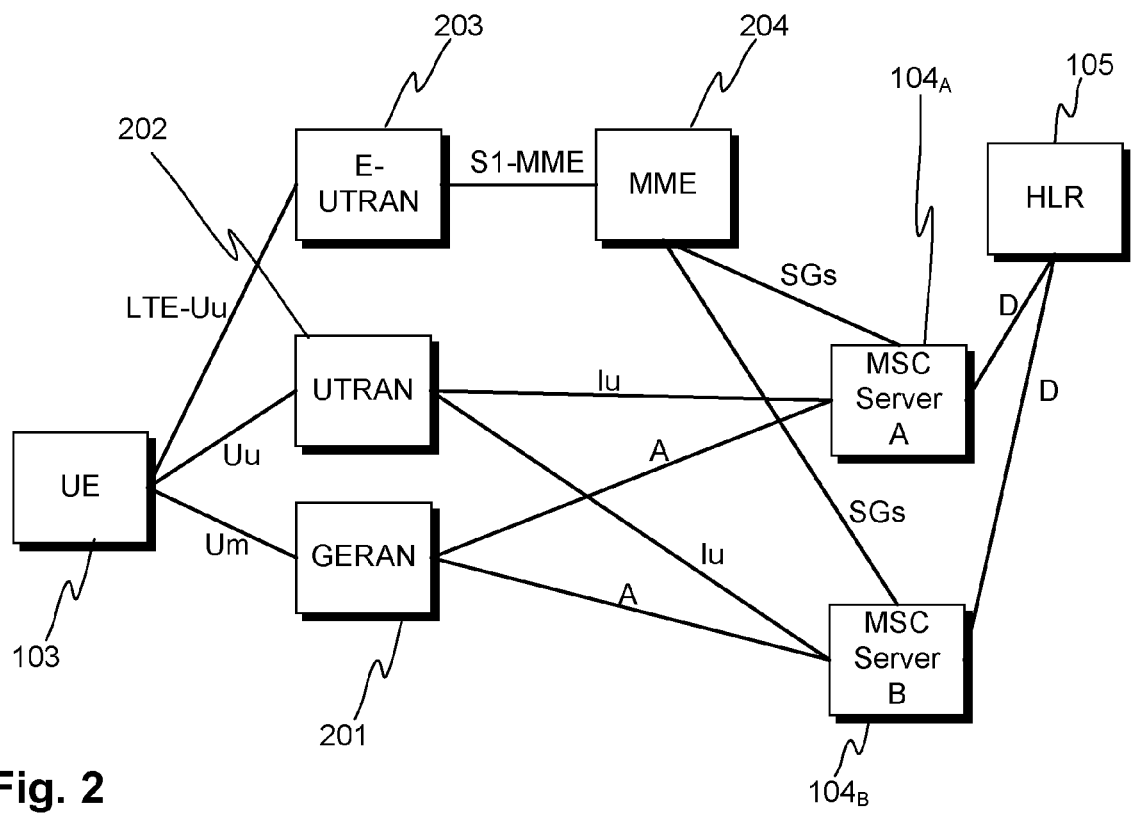
FIG. 2 illustrates an example of a network architecture in which the current invention is applicable.

FIG. 2 illustrates an example of a network architecture in which the current invention is applicable. UE 103 comprises means for interacting with different communications technologies, such as GSM, 3G and LTE. Thus, UE 103 is able to utilize GERAN (GSM EDGE Radio Access Network) 201 over Um interface in the communication. Alternatively or in addition, the UE 103 is able to utilize UTRAN (Universal Terrestrial Radio Access Network) 202 over Uu interface in the communication. Furthermore, the UE 103 comprises means for being interaction with E-UTRAN (Evolved Universal Terrestrial Radio Access Network) 203 over LTE-Uu interface. Both the GERAN 201 and UTRAN 202 are at least partly controlled by MSC servers (MSC Server A, MSC Server B), which comprise VLRs $104_A$, $104_B$ respectively, over either interface A for GERAN 201 or interface Iu for UTRAN 202. Moreover, the E-UTRAN 203 is at least partly controlled by MME 204 over S1-MME interface. In order to manage connections and roaming aspects of UEs 103 an interface SGs is configured to enable signaling between MME 204 and MSC servers thus enabling MME to access to the VLR $104_A$, $104_B$ of a MSC server. The MSC servers and especially VLRs $104_A$, $104_B$ are configured to exchange information with HLR 105 storing subscriber related information over an interface D.

FIG. 2 brings out the challenge in e.g. a CSFB situation in which the UE 103 is served by the LTE network, but needs to be transferred to the WCDMA or GSM network in order to provide circuit switched services. In such a case, due to the fact that so many network elements are involved in the transfer, any additional malfunction, e.g. dual VLR information existing, is a fatal to the whole transition.

Figure 3:
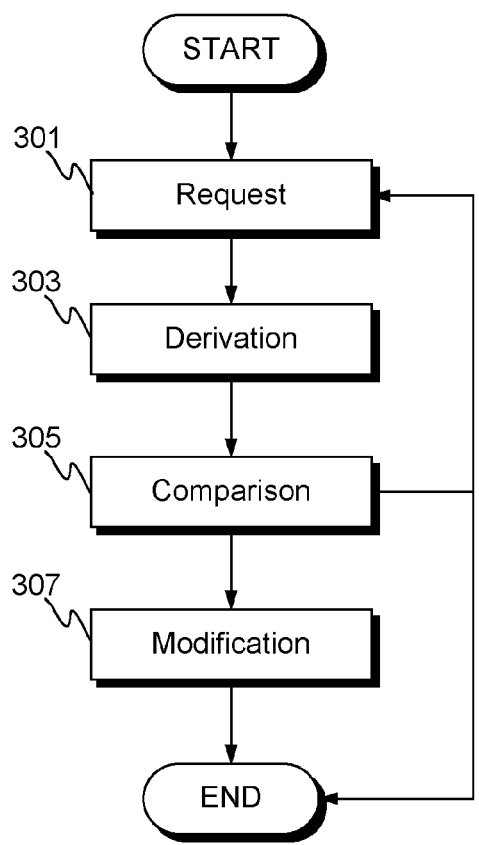
FIG. 3 illustrates a method according to an embodiment of the invention.

FIG. 3 depicts the method steps according to the invention. In step 301, a network element, such as MME 204, receives a request to perform an operation in a mobile communication network. The request relates to a user equipment 103 residing in the mobile communication network.

According to an embodiment of the invention the operation to be performed is requested by a register $104_A$, $104_B$ storing subscriber related information. The requested operation may be a paging operation, which is a broadcast operation organized by the network in order to set up channels for one to one communication between a user terminal and a base station. In practice, paging means that certain cells (i.e. base stations) within the location, where the UE is known to be, broadcast a paging message to the location area in order to find the UE for setting up a communication connection, such as a call. The UEs residing within the location area and receiving the paging request responds to the base station by sending so called channel request message so that the communication connection can be established.

According to another embodiment of the invention the request 301 to perform an operation in the mobile communication network is delivered by a UE 103 through radio access network to a network element, such as MME 204. The requested operation by the UE 103 is a tracking area update request. A list of tracking areas (TA list) is allocated to the UE by the telecom operator. In order to maintain the network aware of the location the UE 103 is configured to deliver the tracking area update request to the network. The request is configured to be delivered periodically or when the UE moves to a tracking area that is not included in its TA list (e.g. the UE moves from one location area to another (the new serving cell is not listed in the TA list)).

Step 303 in FIG. 3 relates to a derivation of information on the register at least partly on a basis of the request 301. Object is to find information on the register, which is or at least has been involved in the management and controlling of the UE in the mobile communication network. The information is to be used in checking if the register is a correct one to the current status of the UE 103.

According to an embodiment in which the paging request is delivered to the network element, such as MME 204, the information on the register $104_A$, $104_B$, which delivers the request, is derived from the request. More precisely, the information on the register $104_A$, $104_B$ is derived by recognizing the register $104_A$, $104_B$. According to an embodiment of the invention an identifier, such as a name, of the register $104_A$, $104_B$ is derivable from the request. The identifier can be any other but the name as long as it can be derived from the request and it is identifying the register $104_A$, $104_B$ from other network nodes.

In a case that a network element has received a tracking area update request from a UE 103, the network element is configured to derive information on the register associated to the UE 103 from a UE context maintained in the network element. More specifically, the network element serving the UE 103, such as a MME 204, is configured to establish, maintain and modify the context for the UE 103. The UE context comprises at least the SGs interface association per UE 103 in the MME 204 so that the MME 204 knows the register for the UE. Thus, as the SGs interface indicates the register, such as VLR, identifier (e.g. name) to the MME 204, the MME 204 may derive information on the register associated to the UE 103 through the UE context in response to receipt of tracking area update request from the UE 103.

In addition to the derivation of the first register $104_A$, $104_B$ as described above the network element is configured to derive information on a register $104_A$, $104_B$, which would be optimal for the UE 103 in its current status. The optimal register $104_A$, $104_B$ is called here as a second register for clarity reasons. The second register is determined by an algorithm using IMSI information of the UE 103 as input information for the algorithm by the network element serving the UE 103. The algorithm is known as IMSI hash algorithm. The information on the second register $104_A$, $104_B$ may be calculated periodically and stored in the memory of the network element, or the information of the second register may be determined in response to the request received in the network element or in response to initiation or completion of the derivation of the information on the first register on the basis of the request, for example. Originally, the IMSI information is delivered to the network in the context of initial attach of the UE to the network and subsequently by using temporary identifiers, such as TMSI (Temporary Mobile Subscriber Identity), which are converted to IMSI by means of network procedures.

In step 305 of the method according to the invention the derived information on the first and the second registers $104_A$, $104_B$ are compared. If the outcome of the comparison 305 indicates a match between the information compared i.e. both derivations have resulted information on the same register, the monitoring of any further requests may be continued, or alternatively the process can be disabled if applicable. But, if the outcome of the comparison 305 indicates a mismatch between the information compared it is detected that there exists dual information on the register $104_A$, $104_B$ to be utilized in the management and controlling of the UE 103 and the information on the first register $104_A$, $104_B$ shall not exist. Information on the dual registers $104_A$, $104_B$ existing in the UE related information may be notified by setting up an identifier indicating this, which can be recognized in the network, for instance.

If the comparison 305 indicates the mismatch between the compared pieces of information, it means that the UE 103 is registered in two different registers $104_A$, $104_B$ at the same time, which causes connection attempts to fail until the dual registration is corrected. In step 307 the information stored in the network is modified in such a manner that the UE 103 is removed from at least one of the registers $104_A$, $104_B$. The modification of information is initiated so that the network element, such as MME 204, performs a location update request of the UE 103 to the second register $104_A$, $104_B$, the second register $104_A$, $104_B$ being the outcome of the derivation of the optimal register $104_A$, $104_B$ for the UE 103 as described in the context of the step 303. According to the invention the second register $104_A$, $104_B$ is configured to deliver an update location message to a third register i.e. to the HLR 105, which is configured to master subscriber related information stored in the network. Generally speaking, the location area update request may comprise at least some of the following parameters: IMSI, a name of the network element (e.g. MME), EPS (Evolved Packet System) location update type, new location area identifier, old location area identifier.

According to an embodiment of the invention the second register $104_A$, $104_B$ receives an indication that dual registers $104_A$, $104_B$ exist for the UE 103, to trigger the location updating towards the third register. If no such indication is delivered from the network element to the second register $104_A$, $104_B$, the second register $104_A$, $104_B$ would not necessarily initiate the location update to the third register, because the subscriber and thus the UE is already registered to the second register $104_A$, $104_B$ with the IMSI. The indication is coupled to the location update request by the network element and the indication informs the second register that the network element has detected a mismatch in comparison, i.e. in step 305.

According to some other embodiment of the invention the network element is configured to modify the location update request to be delivered to the second register $104_A$, $104_B$ in such a manner that the network element clears any old location area information relating to the UE from the location update request. In practice, this means that any location area code is set to null. When such a location update request is delivered to the second register $104_A$, $104_B$, such as a VLR, the second register is forced to make the location update also to the third register, e.g. to the HLR 105. Thus, the location update request is modified by setting any previous location area information to null in the request and then the request is delivered to the second register. The nullification can be achieved by setting the value of the corresponding Location Area Code (LAC) to 0000 or FFFE in hexadecimal representation. More specifically, Location Area Code (LAC) is a fixed length code (of 2 octets) for identifying a location area within a PLMN in question. This part of the location area identification can be coded using a full hexadecimal representation except for the following reserved hexadecimal values: 0000, and FFFE. These reserved values are used in some special cases when no valid LAI exists in the UE.

As the third register, such as HLR 105, receives the location update request from the second register $104_A$, $104_B$, the third register gets to know the correct register $104_A$, $104_B$ to be utilized for the UE 103 in question. In response to the receipt of the location update request the third register is configured to remove information on the first register $104_A$, $104_B$ from the memory of the third register. This may result a delivery of a cancel location message towards the first register $104_A$, $104_B$ and thus, the wrong register $104_A$, $104_B$ is removed from the context of the UE in the network. Additionally, information on the second register is derived from the location update request and stored in the memory of the third register.

Figure 4:
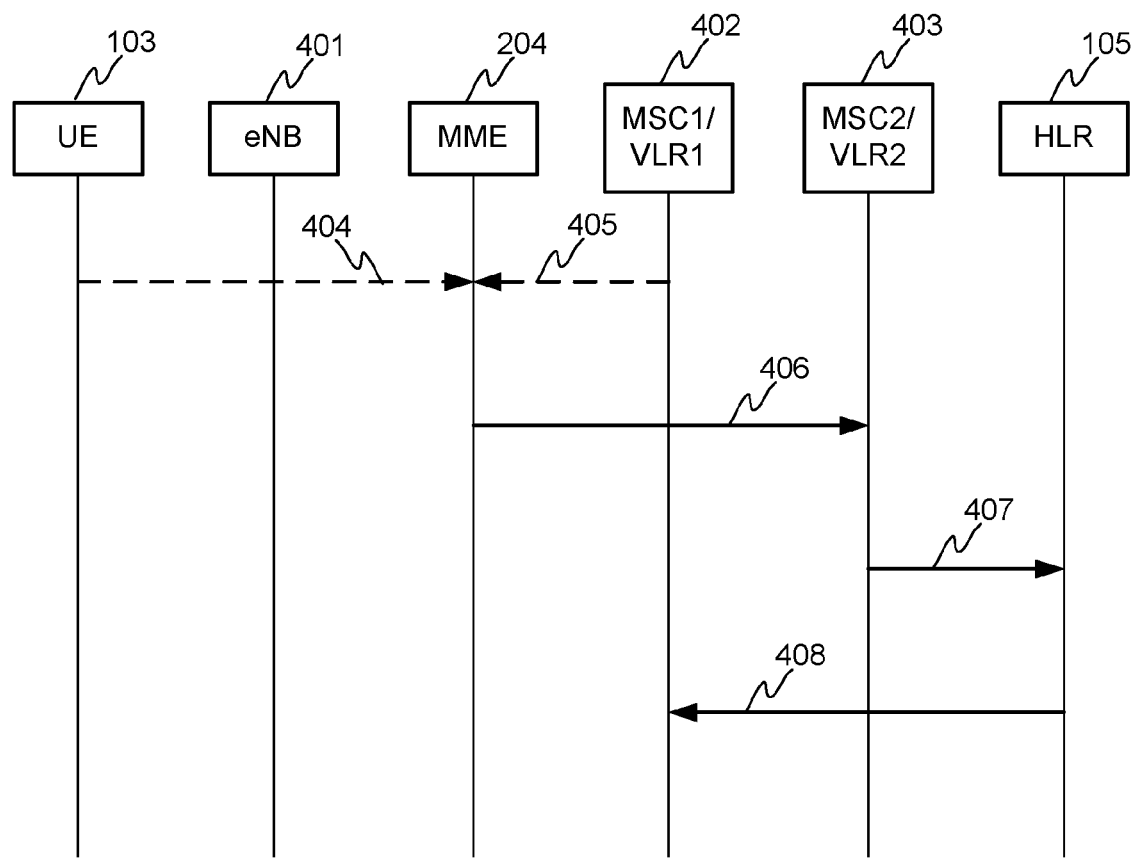
FIG. 4 illustrates the invention by disclosing the signaling between the network nodes.

FIG. 4 illustrates the invention by disclosing the signaling between the network nodes. According to the invention MME 204 may receive a request either from the UE 103 through eNodeB belonging to E-UTRAN 203 or from a VLR1 402. The request 404 from the UE 103 may be e.g. a periodic tracking area update request. The MME 204 as a serving network element for the UE 103 has established and maintained a UE context for the UE 103. The UE context may comprise information on the wrong VLR 402 i.e. MME has an interface SGs association to the wrong VLR 402. Correspondingly, the request 405 from the VLR 402 may be a paging request in order to find the 103 UE for communication purposes. As the MME 204 receives the request 404 or 405 it derives the information on the VLR at least partly on the basis of the request in question as described above. The MME 203 also derives information on the correct VLR 403, which shall be associated to the UE 103 in question by defining it with a so called IMSI hash algorithm. The MME 204 is configured to compare the information on the first VLR 402 and the second VLR 403 and if the outcome of the comparison indicates a mismatch, the MME 204 is configured to deliver 406 a location update request 406 to the second register 403, which is the correct VLR for the UE 103. The location update request also comprises an identifier indicating that the MME 204 has recognized that there exists wrong VLR information in the network into which the UE 103 is associated to. The correct VLR 403 in response to the location update request and the indicator of the wrong VLR 402 is configured to deliver an update location message 407 to the HLR 105 being the master subscriber information database in the network. As the HLR 105 receives the update location message 407 from the correct VLR 403 the HLR 105 is configured to remove information on any wrong VLR 402 in the database and store the information with the information on the correct VLR 403. Finally, the HLR 105 may be configured to deliver a cancel location message 408 to the wrong VLR 402 in order to prevent any further signaling causing malfunction in the network.

Figure 5:
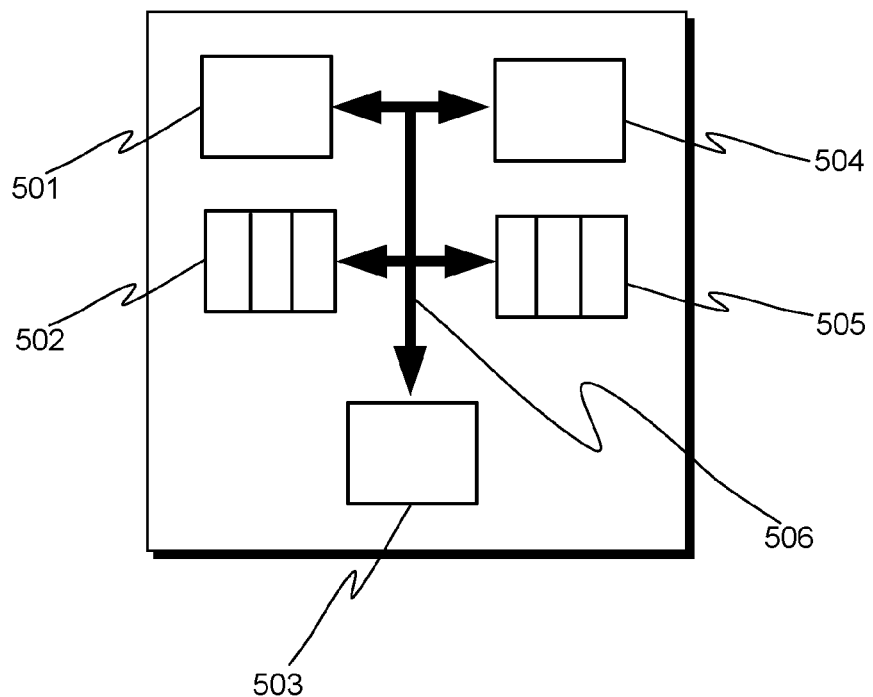
FIG. 5 illustrates a network element according to an embodiment of the invention.

FIG. 5 illustrates a network element, such as a MME 204, according to an embodiment of the invention. The network element comprises a processing unit 501 including one or more processors suitable for executing at least portions of computer program code in order to achieve the network element to perform at least part of the method steps as disclosed. Furthermore, the network element may comprise network connectivity elements 502, random access memory (RAM) 503, read only memory (ROM) 504 and input/output (I/O) devices 505. These components may communicate with one another via a bus 506. In some cases, at least some of these components can locate in a single physical entity or in more than one physical entity.

The processing unit 501 is configured to execute instructions, portions of computer program code or scripts, which can be accessed via network connectivity elements 502, or from RAM 503 or ROM 504. While only one processor is disclosed in FIG. 5, multiple processors may be present.

The network connectivity elements 502 may comprise e.g. modems, Ethernet devices, universal serial bus (USB) interface devices, wireless local area (WLAN) devices, radio transceiver devices, such as GSM radio transceiver devices, WCDMA radio transceiver devices and/or LTE radio transceiver devices. The network connectivity elements may enable the processing unit to communicate with the corresponding telecommunication networks or Internet or other networks over the known interfaces. For example, the network connectivity elements of MME are configured to implement S1-MME interface towards eNode B and SGs interface towards one or more MSC servers containing VLRs.

The RAM 503 can be used to store volatile data and instructions typically in a form of computer program code that are at least partly executed by the processing unit. The ROM 504 is a non-volatile memory and it is used to store instructions in a form of computer program code and perhaps data that are read during execution of instructions.

The I/O devices may include displays, touch screen displays, keyboards, keypads, switches, mice, track balls, voice recognizers, card readers, or other known I/O devices.

According to an embodiment of the invention the network element, such as MME 204, comprises portions of computer program code stored in at least one of the memory elements of the network element and executed by the processing unit to modify information stored in a mobile communication network. More precisely, the processing unit is configured, when executing at least portions of the computer program code stored in at least one of the memory elements of the network element to cause and thus enable the network element to receive a request for an operation in a mobile communication network, The network element is configured to derive information on the first register $104_A$, $104_B$, 402 on the basis of the request. This may mean that the network element either detects that the request is a paging request from a first register $104_A$, $104_B$, 402 or that the request is a tracking area update request from a user equipment 103. If the request is a paging request from the first register $104_A$, $104_B$, 402, the network element is configured to recognize the register delivering the request. According to an embodiment of the invention an identifier, such as a name, of the register is derived from the request. The identifier can be any other but the name as long as it can be derived from the request and it is identifying the register from other network nodes. If the request is the tracking area update request, the network element is configured to derive information on the first register by retrieving the information from a UE context, which is maintained in the network element.

Further, the network element is configured, by executing portions of computer program code stored in a memory element of the network element by means of the processing unit, to determine an optimal register for the UE 103 in question. The determination is performed by means of a predetermined algorithm, such as IMSI hash algorithm, which uses subscriber information, such as IMSI, as an input for the algorithm. The output information of the determination i.e. the optimal register (i.e. second register) information is compared with information on the first register $104_A$, $104_B$, 402 derived on the basis of the request as described. The network element is configured to detect a mismatch between the information on the first and second registers $104_A$, $104_B$, 402, 403 and if the mismatch is detected the network element is configured to request the second register $104_A$, $104_B$, 403 to initiate the modification of information in a third register. The network element may request the initiation of the modification of information in a third register 105 by delivering a location update request to the second register $104_A$, $104_B$, 403. According to an embodiment of the invention the request comprises an indication of the mismatch of the register information in the network as an outcome of the comparison. According to some other embodiment of the invention the network element is configured to modify the location update request by setting any previous location area information to null in the request before delivering it to the second register $104_A$, $104_B$, 403. In this manner the network element may force the second register to deliver the location update request further to the third register, such as HLR 105. In the described manner the network element may modify the information in the network and correct any misinformation stored in any of the network nodes.

The network element as described is according to an embodiment of the invention a MME 204. According to some other embodiment the network element as described, which implements at least part of the method steps of the invention, is so called SGSN (Serving GPRS Support Node), which is responsible for the delivery of data packets from and to the UEs within its geographical service area. SGSN is configured to route and transfer packets, take care of the mobility management (attach/detach and location management) and logical link management, and authentication and charging functions. The location register of the SGSN stores location information, such as current cell and/or current VLR, and also information on user profiles (e.g., IMSI) of all GPRS users registered with this SGSN. Thus, the SGSN implements similar tasks as MME in LTE technology and thus, the current invention can be implemented also in SGSN in order to modify information stored in a mobile communication network if there exist faulty information with respect to registers the user equipment i.e. the subscriber is associated to. Especially, applying the invention in SGSN relates to management of user information for WCDMA and GSM networks.

Even if it is mainly described here that the VLR may be implemented in the MSC server, it is possible to that the VLR is coupled to any other network node than the MSC server. Moreover, the VLR can be independent network element within the network. The VLRs as well as other registers, such as HLR, may comprise processing and computing means in addition to the database structure in order to implement network related operations and tasks.

Some advantageous embodiments according to the invention were described above. The invention is not limited to the embodiments described. The inventive idea can be applied in numerous ways within the scope defined by the claims attached hereto.

What is claimed is:

1. A method for modifying information stored in a mobile communication network, the method comprising:
   receiving, in a network element, a request for an operation in the mobile communication network relating to a user equipment,
   deriving information on a first register on the basis of the request,
   determining information on a second register for the user equipment in the network element, comparing information on the first register derived on the basis of the request with information on the second register determined for the user equipment in the network element, and when the outcome of the comparison indicates a mismatch between the information on the first and second registers,
   requesting the second register to initiate the modification of information in a third register,
wherein the initiation of the modification of information in a third register comprises a step of delivering a location update request to the second register, and
wherein the location update request is modified so that any old location area information is cleared in the request.

2. A method as claimed in claim 1, wherein an indication of the mismatch between information compared is added to the location update request.

3. A method as claimed in claim 1, wherein the location update request is modified by setting any previous location area information to null by the network element.

4. A method as claimed in claim 1, wherein the request for an operation in the mobile communication network is at least one of the following: a paging request from the first register, a tracking area update request from the user equipment.

5. A method as claimed in claim 1, wherein information on the second register for the user equipment is determined on the basis of IMSI information.

6. A method as claimed in claim 1, wherein the information on the first and second registers used in the comparison is an identifier of the corresponding register.

7. A method as claimed in claim 1, wherein the mismatch of the information on the first and the second registers indicates that the registers are not the same.

8. A method as claimed in claim 1, wherein the modification of information in the third register comprises a step of removing information on the first register.

9. A method as claimed in claim 1, wherein the modification of information in the third register comprises a step of storing information on the second register.

10. A network element, comprising
   at least one processor
   at least one memory comprising portions of computer program code,
   the memory and the portions of computer program code are configured to, with the at least one processor, cause the network element at least to perform the following:
      receive a request for an operation in the mobile communication network relating to a user equipment,
      derive information on a first register on the basis of the request,
      determine information on a second register for the user equipment,
      compare information on the first register and information on a second register,
   and when the outcome of the comparison indicates a mismatch between the information on the first and second registers,
      request the second register to initiate the modification of information in a third register,
   wherein the initiation of the modification of information in a third register comprises a delivery of a location update request to the second register, and
   wherein the location update request is configured to be modified so that any old location area information is cleared in the request.

11. A network element as claimed in claim 10, wherein the network element is configured to add an indication of the mismatch between information compared to the location update request.

12. A network element as claimed in claim 10, wherein the network element is configured to modify the location update request by setting any previous location area information to null in the request.

13. A network element as claimed in claim 10, wherein the network element is configured to detect that the request for an operation in the mobile communication network is at least one of the following: a paging request received from the first register, a tracking area update request received from the user equipment.

14. A network element as claimed in claim 10, wherein the network element is configured to determine information on the second register for the user equipment on the basis of IMSI information.

* * * * *